H. G. CUNNINGHAM.
EXPANDING CLAW FOR MOVING PICTURE MACHINES.
APPLICATION FILED SEPT. 4, 1920.

1,380,532.

Patented June 7, 1921.
2 SHEETS—SHEET 1.

Inventor
Harry G. Cunningham
by Nestall and Wallace
his Attorneys

H. G. CUNNINGHAM.
EXPANDING CLAW FOR MOVING PICTURE MACHINES.
APPLICATION FILED SEPT. 4, 1920.
1,380,532.
Patented June 7, 1921.
2 SHEETS—SHEET 2.
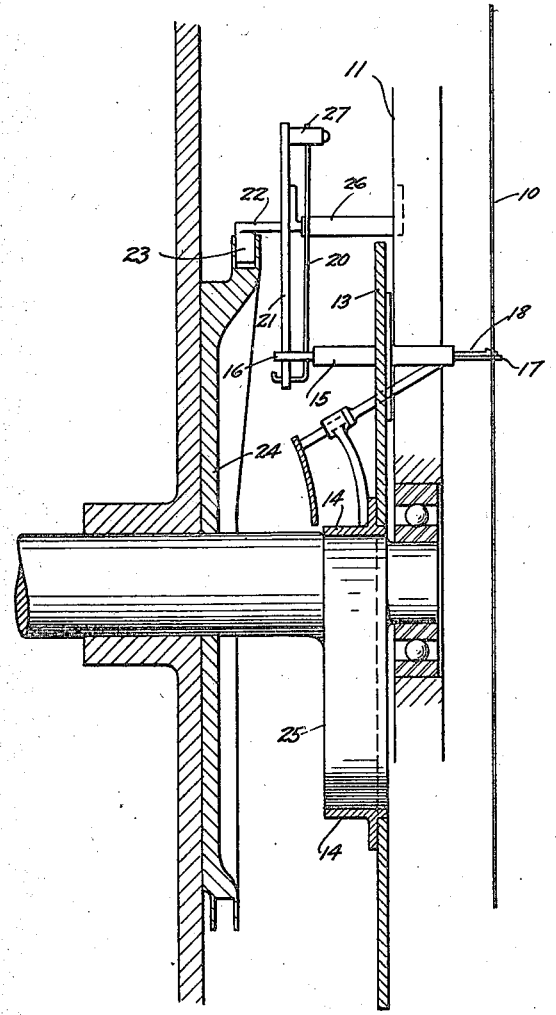
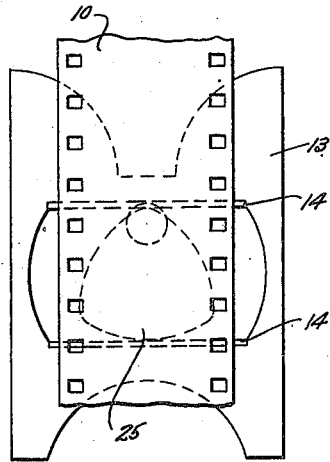
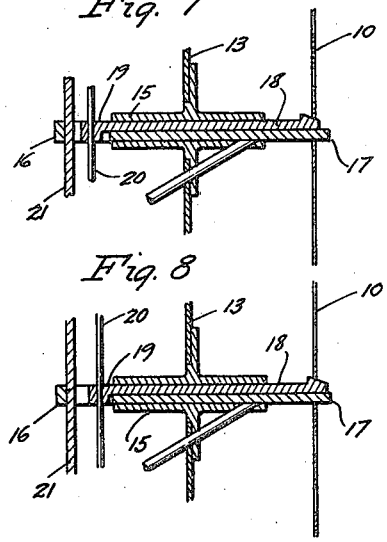
Inventor
Harry G. Cunningham
by Westall and Wallace
his Attorneys

UNITED STATES PATENT OFFICE.

HARRY G. CUNNINGHAM, OF LOS ANGELES, CALIFORNIA.

EXPANDING CLAW FOR MOVING-PICTURE MACHINES.

1,380,532.	Specification of Letters Patent.	Patented June 7, 1921.

Application filed September 4, 1920. Serial No. 408,135.

*To all whom it may concern:*

Be it known that I, HARRY G. CUNNINGHAM, a citizen of the United States, and residing at Los Angeles, in the county of Los Angeles and State of California, have invented new and useful Improvements in Expanding Claws for Moving-Picture Machines, of which the following is a specification.

This invention relates to motion picture cameras and projectors and has to do especially with the claw mechanism. The usual film for cameras and projecting machines is provided with marginal perforations. A claw mechanism is arranged to engage the film by insertion of picker fingers in the perforations, the fingers then being advanced and the film drawn to the next position in the kinetographic series. Thereupon, the fingers are withdrawn from the perforations and moved to the starting point for another cycle of operations. Due to various factors, it is the practice to make the dimensions of the picker fingers such that there is a clearance between the edges of a perforation and a finger. This results in a tendency for the film to overrun the exposure aperture. For this reason, various devices have been employed to place a tension on the film. A type of such device in common use, consists of a shoe pressed upon the film by spring means. Such a construction results in scratching the film and hard running.

It is the primary object of my invention to provide a claw mechanism having picker fingers which fill the perforations and thereby prevent overrunning. It is another object of this invention to provide picker fingers which are expansible, whereby they may be easily inserted in the perforations and then expanded to fill the same. In addition to the broader objects of this invention there are certain features of design whereby a compact, simple, and positively operating mechanism is obtained.

Figure 1:
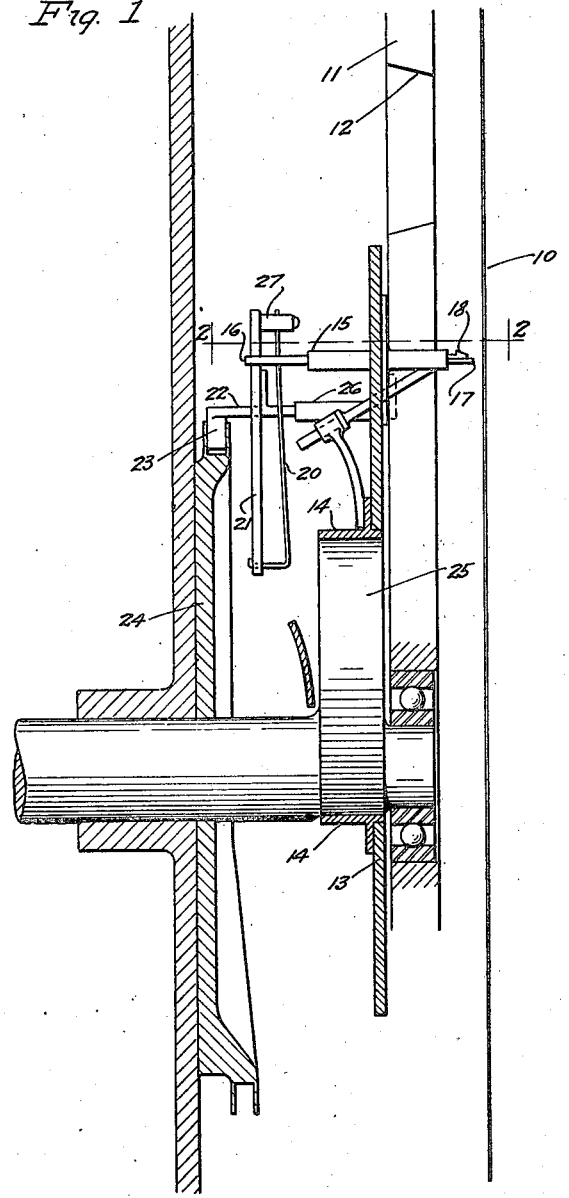
Figure 2:
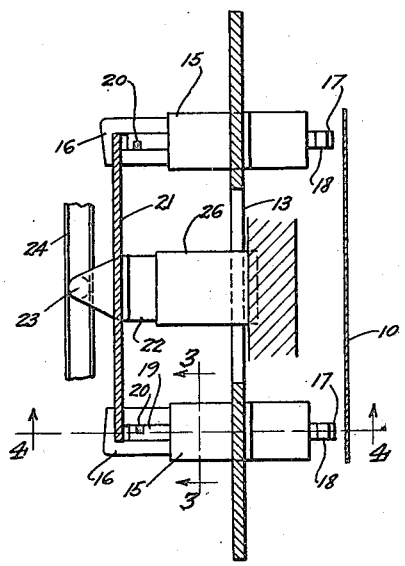
Figure 3:
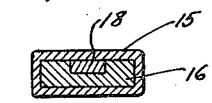
Figure 4:
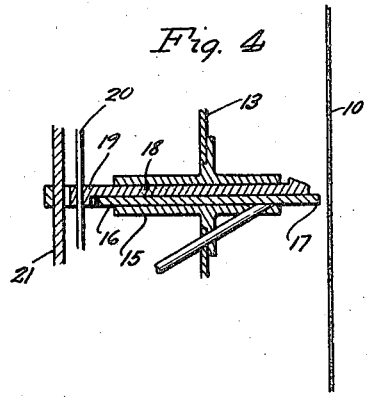

The above mentioned objects together with other objects and corresponding accomplishments are obtained by means of the embodiment of my invention illustrated in the accompanying drawings, in which:

Figure 1 is a vertical section through the front of a camera showing my improved mechanism applied thereto; Fig. 2 is a section as seen on the line 2—2 of Fig. 1; Fig. 3 is a section as seen on the line 3—3 of Fig. 2; Fig. 4 is a section as seen on the line 4—4 of Fig. 2; Fig. 5 is a section similar to Fig. 1 showing the claw mechanism in its lower position; Fig. 6 is a diagrammatic front view showing the relative position of the film and claw mechanism; and Figs. 7 and 8 are sections similar to Fig. 4, but showing the elements of the picker fingers in other positions.

Referring more particularly to the drawings, a film having the ordinary marginal perforations is indicated by 10. A plate 11 is disposed in the camera box and has a stationary aperture 12. This plate is similar to the one in common use in cameras. Mounted in race ways on the plate 11 so that it may slide vertically is a race 13. This race carries the picker fingers which are projected at the upper limit of travel and retracted at the lower limit. The race is provided with a slide way consisting of laterally projecting walls 14 defining an opening, in which a cam operates. Secured to the race and adjacent the top thereof and in registration with the marginal portions of the film are sleeves 15, in which the picker fingers are disposed.

As the picker fingers are similar in construction only one will be described. Slidably disposed in a sleeve 15 is the finger body 16. The tip 17 of the finger is reduced in thickness, and disposed slidably thereon and extending through a slot in the body 16 is an expander 18. The tip of the expander is wedge-shape. The body 16 adjacent its rear end is provided with an opening, in which is disposed a lug 19 formed on the rear of the expander. The lug 19 has an opening extending therethrough to receive a guide wire 20. The guide wire is arranged to project the expander relative to the finger body as the race moves toward the lower end of its travel. The entire finger with its expander is moved so as to project the tip of a finger into a perforation when the race is at the top of its travel. Secured to the finger body is a plate or frame 21. Riveted or otherwise secured to the frame 21 is a member 22 having a follower 23 mounted in the way of a cylindrical cam 24. The construction is such that upon rotation of the cam the follower is moved laterally and then returned to its initial position. This causes the frame 21 to be moved laterally and with it the picker fingers. Mounted on the same shaft as cam 24 is a cam 25 which reciprocates the race. Cams 24 and 25 are so adjusted that the picker fingers will be projected at the upper limit of travel of the race and retracted at the lower limit of travel. The frame 21 is stationary with respect to race 13 except for lateral movement. To provide for relative lateral movement of the frame and race, there is a telescopic connection between them. A sleeve 26 is secured to the plate 11. Slidably mounted within the sleeve is the forward portion of member 22. Thus, the frame may move to and from the plate 11 in a lateral direction but cannot move to reciprocate vertically. Each of the guide wires is secured to the upper end of frame 21 by a post 27 and is normally inclined toward the plate 11. The lower end of the guide wire slidably extends through an opening in the frame 21, so that pressure on the guide wire tending to force the latter toward the frame 21 will be compensated for by movement of the guide wire. Thus, in Fig. 5 the guide wire is shown moved almost parallel to the frame.

The mechanism operates as follows:

At the upper position of the race, the picker fingers are projected, engaging perforations on the film. However, the expanders are retracted as shown in Figs. 1 and 4. As the race is moved downwardly, the expanders will be projected by reason of the guide wires 20 forcing them forward. The tips 17 of the picker fingers are easily inserted in the perforations in the film, the expanders being projected as the film is moved downwardly, until by reason of the wedge shape of the expanders the perforations are entirely filled. The wires 20 by reason of their resiliency compensate for any irregularities in the position of the perforations or in their size. In Figs. 7 and 8 the picker fingers and expanders are shown fitting openings of different sizes, and in Fig. 5 the position of the guide wire 20 is shown where the expander cannot be projected into a perforation as far as in the average case.

It is obvious from the foregoing description that I have provided an expanding claw completely filling the perforations of the film. By reason of this construction the film and claws have no looseness, especially at the limit of travel of the claw. The film will be drawn to an exact position and will be left in that position. There is no opportunity for the film to move farther by reason of any looseness of connection between the fingers and the film.

What I claim is:

1. A claw mechanism for moving picture machines adapted for film with perforations, comprising in combination picker fingers having expansible tips, and means to expand the tips after their insertion in said perforations.

2. A reciprocating claw mechanism for moving picture machines adapted for film with perforations, comprising in combination picker fingers having tips provided with expanders, and means to project said expanders after insertion of said fingers in said perforations.

3. A reciprocating claw mechanism for moving picture machines adapted for film with perforations, comprising in combination picker fingers having tips provided with expanders slidably mounted on the body of said fingers, said expanders having wedge-shaped tips, and resilient means to project said expanders after insertion of said fingers in said perforations.

4. A reciprocating claw mechanism for moving picture machines adapted for film with perforations, comprising in combination a reciprocating race, picker fingers slidably mounted on said race for projection and retraction, said fingers having expansible tips, and means to expand and contract said tips in synchronism with reciprocation of said race.

5. A claw mechanism for moving picture machines adapted for film with perforations comprising in combination a reciprocating race, picker fingers slidably mounted on said race for projection and retraction, said picker fingers having tips provided with expanders, and means to project said expanders after insertion of said fingers in said perforations and retract said expanders after withdrawal from said perforations.

6. A reciprocating claw mechanism for moving picture machines adapted for film with perforations, comprising in combination a reciprocating race, picker fingers slidably mounted on said race for projection and retraction, said picker fingers having expanders slidably mounted on the body of said fingers, said expanders being provided with wedge-shaped tips, and resilient means to project said expanders after insertion of said fingers in said perforations and to retract said expanders after withdrawal of said fingers from said perforations.

In witness that I claim the foregoing I have hereunto subscribed my name this 26th day of August, 1920.

HARRY G. CUNNINGHAM.